United States Patent [19]

Sorenson

[11] 4,126,171
[45] Nov. 21, 1978

[54] TIRE SHOULDER TRIMMING DEVICE
[75] Inventor: Billy L. Sorenson, Muscatine, Iowa
[73] Assignee: Bandag Incorporated, Muscatine, Iowa
[21] Appl. No.: 724,764
[22] Filed: Sep. 20, 1976
[51] Int. Cl.² .................................... B29H 21/08
[52] U.S. Cl. ................................................ 157/13
[58] Field of Search ....................................... 157/13
[56] References Cited

U.S. PATENT DOCUMENTS

| | | | |
|---|---|---|---|
| 2,939,520 | 6/1960 | Frohlich et al. | 157/13 |
| 2,996,109 | 8/1961 | MacMillan | 157/13 |
| 3,426,828 | 2/1969 | Neilsen | 157/13 |
| 3,473,596 | 10/1969 | Meixner | 157/13 |
| 3,478,804 | 11/1969 | Meixner | 157/13 |
| 3,929,043 | 12/1975 | Nishimura | 157/13 X |
| 3,965,959 | 6/1976 | Weir | 157/13 |

Primary Examiner—James L. Jones, Jr.
Assistant Examiner—James G. Smith
Attorney, Agent, or Firm—Cushman, Darby & Cushman

[57] ABSTRACT

A machine is shown for conditioning a tire carcass for recapping wherein the tire is rotated while the crown is rasped to size and then a feeler is dropped onto the rasped crown surface while the tire continues to rotate. The feeler rides on this rasped surface to control the application of power driven shoulder rasping means to the carcass, the shoulder rasping means being operative on the opposite sides of the feeler to condition the shoulders for further processing. Adjustable guide means are shown for directing the paths of movement of shoulder rasping means to cause them to move in a desired pattern over the respective shoulders with which each shoulder rasper is made to cooperate.

14 Claims, 13 Drawing Figures

TIRE SHOULDER TRIMMING DEVICE

BACKGROUND

The conditioning of partly worn tire carcasses for recapping is a well developed art. Buffing machines for removing excess tread stock from worn tires have been developed making use of work supports for mounting and rotating a tire to be processed at a work station while buffing or rasping tools are applied to the peripheral surface of the carcass. Power means are provided for rotatably driving the tire being worked on and the usually rotatably driven rasping tools that are used against the peripheral surface of the driven tire carcasses to buff the surface to be retreaded.

Prior disclosures of typical machines adapted for this purpose are shown in the U.S. Pat. Nos. 2,939,520 to Frolich, June 7, 1960 and 2,996,109 to MacMillan, Aug. 15, 1961. While these machines serve the purpose of rasping and otherwise conditioning the crown and shoulders of a tire carcass to be retreaded, they lack the ability to rapidly perform the precision shaping of the periphery of the carcass. These prior art machines do not provide for the adjustability of rasping tool working patterns that are needed in modern machines designed for general application to conventional tires that must be processed in many different sizes and shapes.

BRIEF DESCRIPTION OF THIS INVENTION

The present apparatus provides a rigid frame or support means for carrying a tire mounting and working station. A tire to be retreaded is carried on suitable mounting means at the work station to be rotatably driven so that the outside surface of the tire carcass is exposed in a position to be buffed, rasped and otherwise treated over its entire outer periphery to properly condition that surface for the recapping procedure. Suitable side wall buffing means may be supported on the frame, which also carries a power driven crown rasping tool mounted on table means having an incremental infeed as well as a cross-feed drive to perform a precision trimming of the crown of the carcass.

When the crown has been precision trimmed around the entire periphery of the carcass, a power operated feeler means carried in a fixed position on the support frame at the work station is moved downwardly from above to engage against the surface of the rotating tire in a path that forms the centerline of the buffed crown portion of the periphery, the feeler being operative to be moved rapidly downwardly until contact with the crown takes place and then the downward feeding of the feeler is terminated while power feed is initiated to drive a pair of shoulder rasping means over the respective shoulders of the tire carcass that are disposed on the opposite sides of the position of the feeler on the centerline of the crown.

The direction of movement of the driven shoulder rasping tools downwardly and across each of the shoulder areas is controlled by guide means that become operative when relative downward motion of the feeler is terminated and the rotating shoulder rasping means begin to contact the periphery of the tire. The differential motion between the feeler that rides in a relatively fixed position as it continues to ride on the rasped crown and the continued downward movement of the separate, driven shoulder rasping means relative to the fixed position of the feeler is utilized to cause the moving shoulder raspers to coact with suitable guides to control the path of movement of the shoulder rasping means to produce precision ground shoulders that are equidistantly spaced on opposite sides of the centerline of the buffed crown.

The guide means that are provided may take the form of stationary cam-like means to control the relative positions of each of the shoulder rasping tools as they are operatively driven across the shoulder areas of the tires. Preferably the guide means may be adjustably mounted on the apparatus to guide the shoulder rasping means at an exact angle with respect to the rasped crown surface and the shoulder rasping tools may also be adjustably mounted to be moved toward or away from each other simultaneously in order to control the precise width of the rasped crown.

With such adjustability built into the tool mounting and motion controlling means, all sizes and shapes of tires that can be mounted on the driven tire chuck at the working station, can be properly and very precisely buffed to shape and the surfaces conditioned for retreading.

It is therefore an object of this invention to provide an improved machine for buffing tire carcasses to be retreaded.

Another object of this invention is to provide a precision buffing apparatus for rasping the crown portion and the shoulders of a tire carcass.

Another object of the invention is to provide a machine, the elements of which may be easily adjusted to accommodate tire carcasses of different sizes and shapes.

Another object of this invention is to provide a power driven buffing machine having automated tool feed mechanisms for producing precision rasped tire carcasses adapted for recapping.

These and other objects will appear more fully in the detailed specification below.

DETAILED DESCRIPTION

Figure 1:
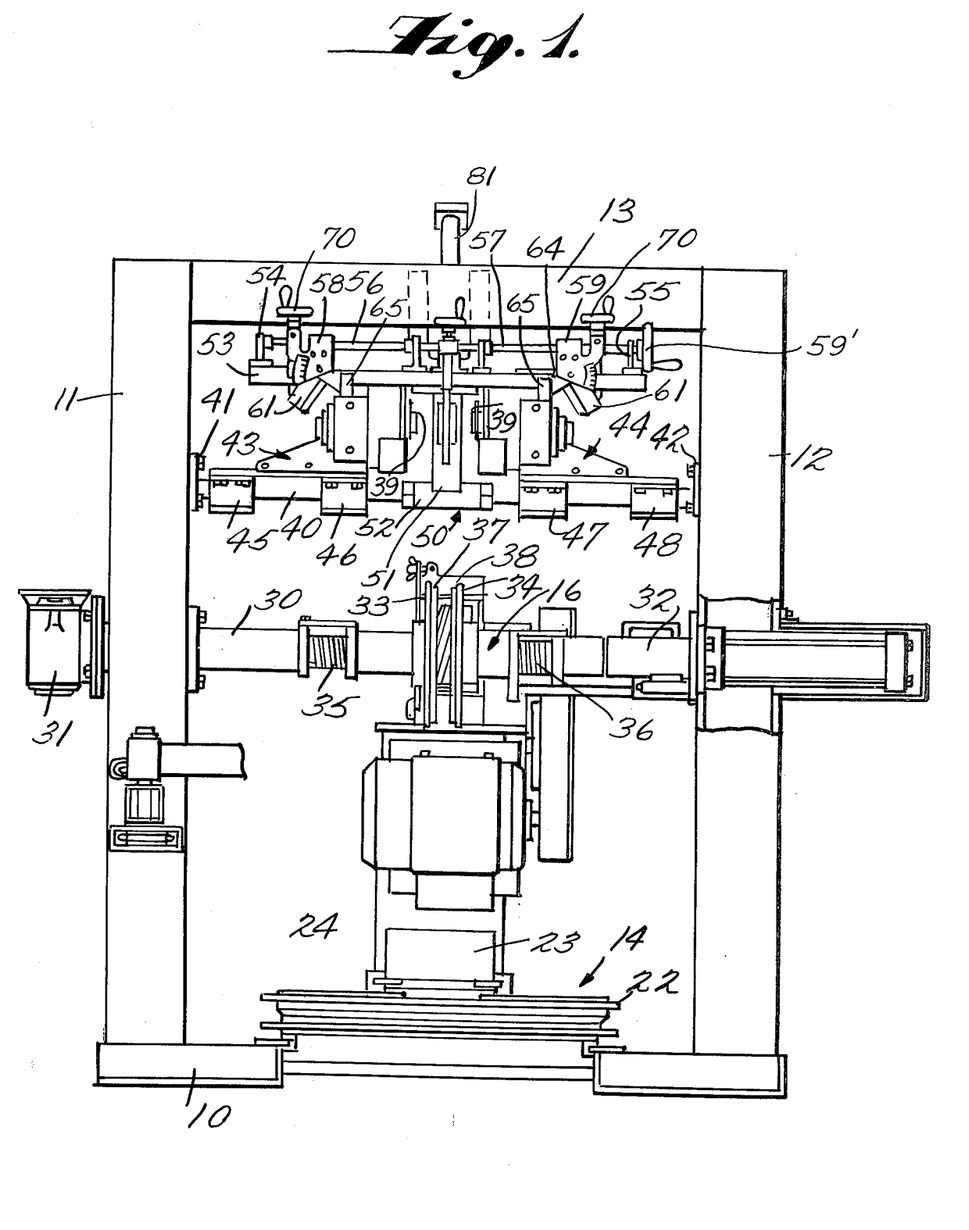
FIG. 1 is a front elevation, partly broken away, showing the machine of this invention.
Figure 2:
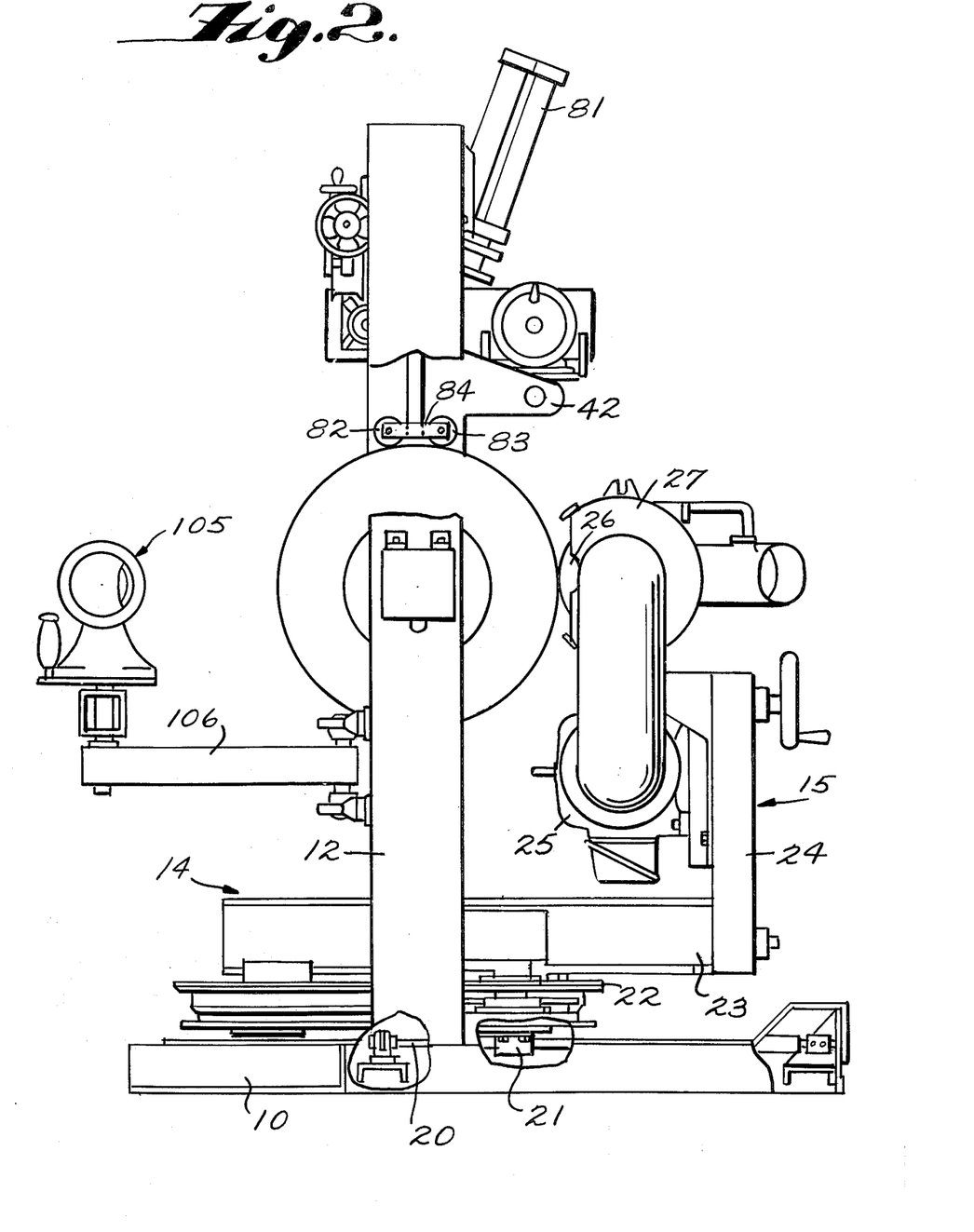
FIG. 2 is a side elevation of the assembly shown in FIG. 1, partly broken away, showing a tire mounted in the machine to be rasped.

The herein disclosed tire buffing machine as shown in FIGS. 1 and 2 is built on a rigid support frame having a base 10, uprights 11 and 12 and a crossbar 13 connected between the tops of the uprights. The base member 10 supports a movable table means 14 for carrying the driven crown rasping means and the table is adapted to have incremental movement from the back of the machine toward the front and a power driven crossfeed. The table supports the rasp assembly 15 in position to cause the rasping means to buff the crown of a tire mounted on a suitable chuck means 16 carried between uprights 11 and 12.

The table 14 is carried on suitable slide bearing means integral with base 10 and the table driven toward the front of the machine in increments by means of the intermittently driven table slide feed screw 20 rotatably supported on base 10 and cooperating with the nut unit 21 integral with the underside of table 14. The table also has an intermittently driven crossfeed including a conventional power driven means for sliding the top section 22 of the table at right angles to the direction of movement produced by screw 20. The top section 22 of the table has a rigid beam 23 integrally attached thereto to which the rasp assembly 15 is fixedly attached. The rasp assembly is fixed to the upper end of an upright post 24 to hold the rasping means in position to be driven into engagement with the crown portion of a tire carcass rotatably supported on chuck 16. The rasp assembly means includes a motor 25 for driving a rasping wheel 26 that is enclosed in a housing 27 having suitable suction fan means connected thereto to collect the debris ground free from the tire when the rasp assembly is being forced against the crown of a tire carcass as the conditioning process begins.

The tire supporting chuck 16 is rotatably mounted between the uprights 11 and 12 on a tire drive spindle rotatably carried within housing 30 and being driven by a motor (not shown) connected to the gear drive means encased in housing 31. A cooperating tire support spindle is oppositely disposed with respect to spindle 30 and is supported on bearings in housing 32. Chuck plates 33 and 34 are carried at the inner ends of the respective tire support spindles and the plates may both be opened or closed relative to each other by operation of the right and left hand thread elements 35 and 36 associated with the separate spindle means. When chuck plates for a particular sized tire to be rasped have been mounted on the ends of the spindles, the chucks are moved apart and the tire carcass held in place while the chuck plates are driven together to engage the tire tightly on the sloping seats 37 and 38 of the two chucks. When the tire is thus clamped between the chuck plates 33 and 34, the spindle 30 may be driven to rotate the tire in front of rasping wheel 26.

The crown rasping wheel is fed forwardly to drive the wheel 26 against the crown and then a crossfeed step is initiated. When a cut has been made across the crown, the table 14 is stepped forwardly one increment and a return crosscut is made across the crown. When the desired number of cuts has been made and the crown of the tire has been properly conditioned for recapping as indicated at A in FIG. 13, the remaining rasping of the shoulders and side walls of the carcass may proceed.

Near the top of uprights 11 and 12, shoulder rasping means are provided to engage against the shoulders of the carcass on opposite sides of the crown of the tire. A pair of shoulder rasping tools are provided, one for each shoulder and such means include well known cutting wheels 39 and 39', FIGS. 3 and 13, adapted to be rotatably driven to engage against the shoulder area of the carcass to cut away the unwanted rubber. The rasping assembly means for the shoulders includes a drive pulley means enclosed in a housing that constitutes a rigid support frame for the shoulder rasping means and each housing or frame means is pivotally supported on the horizontally disposed bearing rod 40 to be moved downwardly against the top portion of the tire carcass supported on chuck 16. The opposite ends of rod 40 are carried in rearwardly extending brackets 41 and 42 integral with posts 11 and 12 of the frame.

The bearing rod 40 carries the two spaced apart and separate shoulder rasping assemblies 43 and 44. Assembly 43 has aligned bearings 45 and 46 integral therewith that are carried on shaft 40 to rotate about the fixed axis of shaft 40 and also are adapted to slide longitudinally along the shaft 40. Shoulder rasping assembly 44 has similarly aligned bearings 47 and 48 for supporting it in both a rotating and sliding relationship with respect to shaft 40. The ends of each of the shoulder rasping assemblies 43 and 44 opposite from bearings 45-46 and 47-48, oscilate about the axis of shaft 40 and have wheels 49, FIG. 7, that are supported in cam-like guide means that produce the controlled lateral sliding of the assemblies in opposite directions away from each other from the dotted line positions in FIG. 13 to the full line positions, as their respective bearing supports 45 and 46, 47 and 48 slide along rod 40 as the assemblies are simultaneously oscilated about shaft 40.

The structure of the guide means that supports the oscilating ends of the raspers and causes the shoulder rasping assemblies to slide latterly apart as the wheels 49 at their ends engaged in the guides and are oscilated downwardly, is best seen in FIGS. 3, 4, 7 and 8. Each guide means includes a body 60 having a cam guide track 62 formed therein, the bodies 60 being supported in a spaced apart relation with respect to each other to cooperate with the oscilating ends of the two spaced apart shoulder rasping assemblies.

Figure 3:
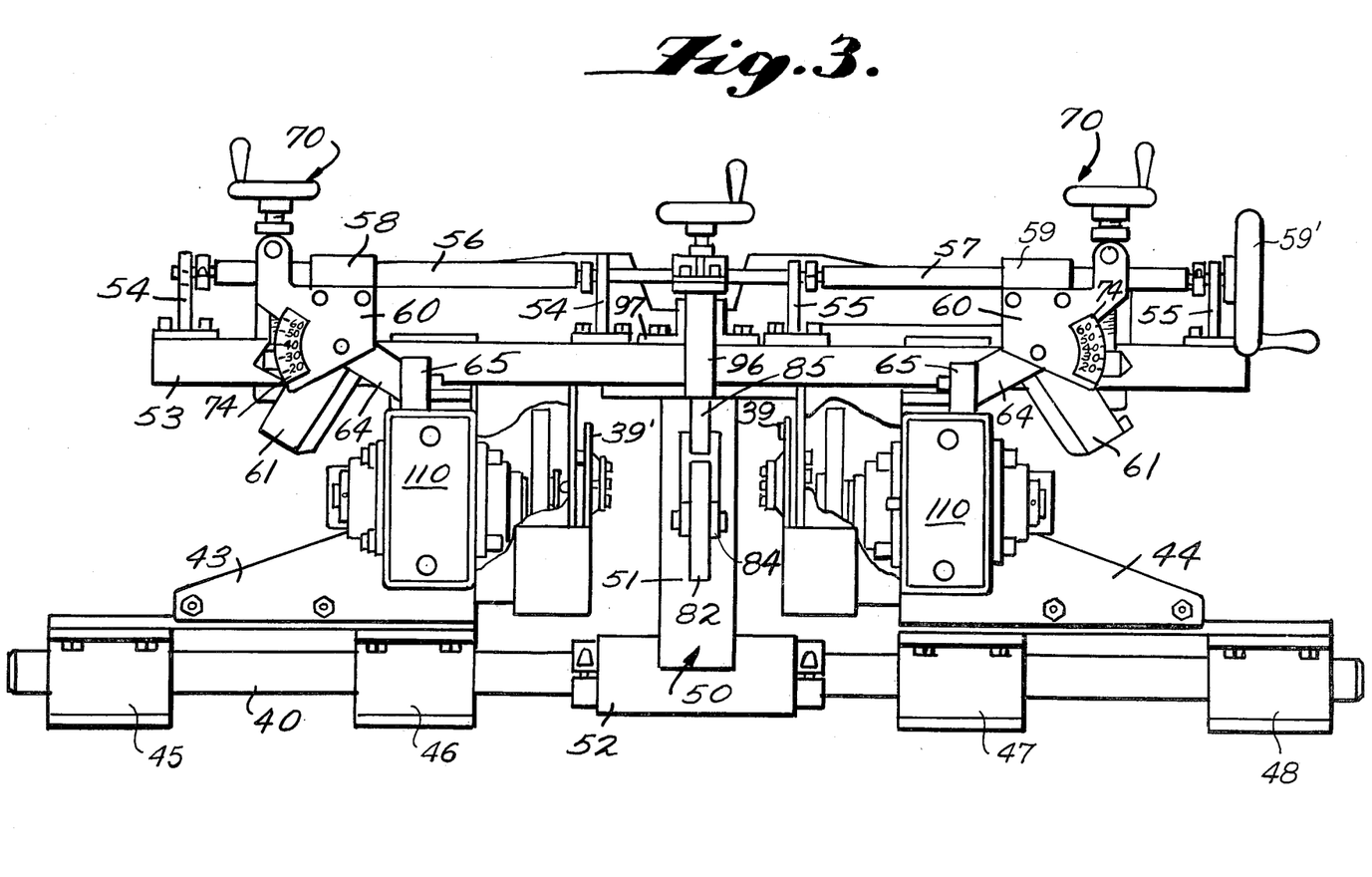
FIG. 3 is an enlarged front elevation showing details of the shoulder rasper assemblies.
Figure 4:
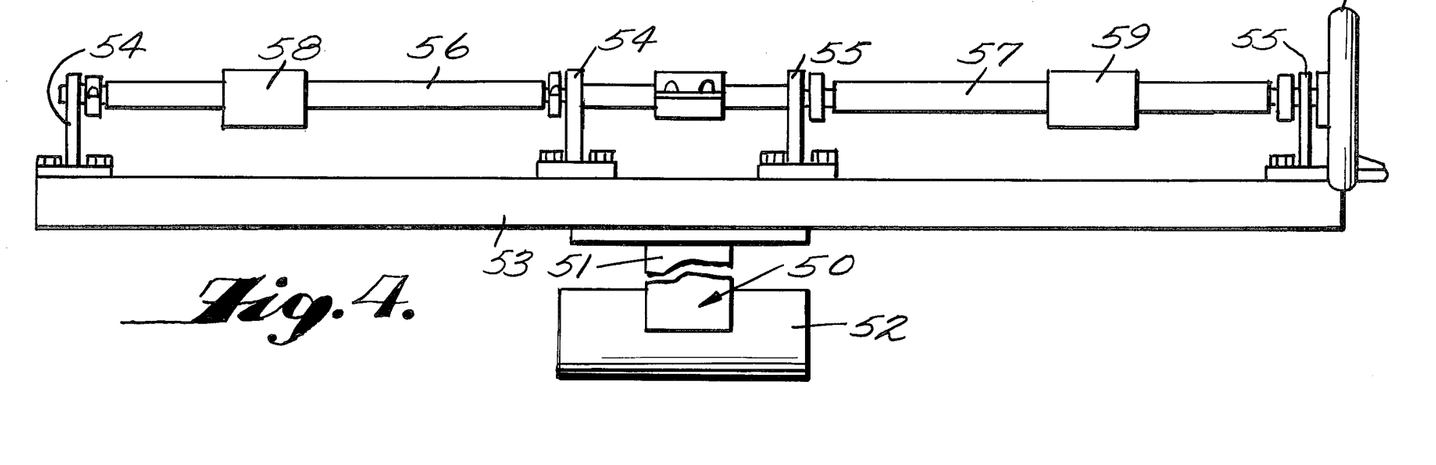
FIG. 4 is front detail view of the T-bar means for supporting feeler means for engaging the crown of the tire and means for adjusting the position of the shoulder rasping means.

As is best seen in FIGS. 1, 3 and 4, the cam guide assemblies are supported for adjustment toward or away from each other on an oscilating T-shaped carrying bar generally denoted 50, the lower end of the center support weldment 51 of the T-bar being mounted on a bearing 52 that oscilates about shaft 40. The crossbar 53 of the T on which the cam guide assemblies are mounted, has pairs of integral forwardly extending spaced apart bearing support brackets 54 and 55 fixed to its upper surface, the pairs of brackets 54 and 55 serve to rotatably support the right and left hand threaded width adjusting screws 56 and 57 respectively, which in turn carry right and left hand threaded nuts 58 and 59. The nuts 58 and 59 may be simultaneously moved toward or away from each other by wheel 59' that is adapted to drive both screw means 56 and 57 together. As shown in FIGS. 1 and 3, nut 59 supports a carrier body 60 that depends from the nut to extend downwardly in front of the crossbar 53 of the T-bar support. The other cam guide assembly includes an identical carrier body 60 that is similarly suspended from nut 58 on screw 56 and both bodies 60 have buffing angle guides 61 pivotally hung thereon. Each buffing angle guide has a cam track 62, FIG. 7, formed therein for cooperating with a cam roller 49 that is rotatably carried on the pivot bracket 64 which is fixed to the swinging end of one of the shoulder buffing assemblies 43 or 44 by means of the integral stud element 65. Buffing assembly 44 likewise has an integral stud 65, bracket 64 and cam roller 49 for cooperating with its respective cam track 62.

Figure 6:
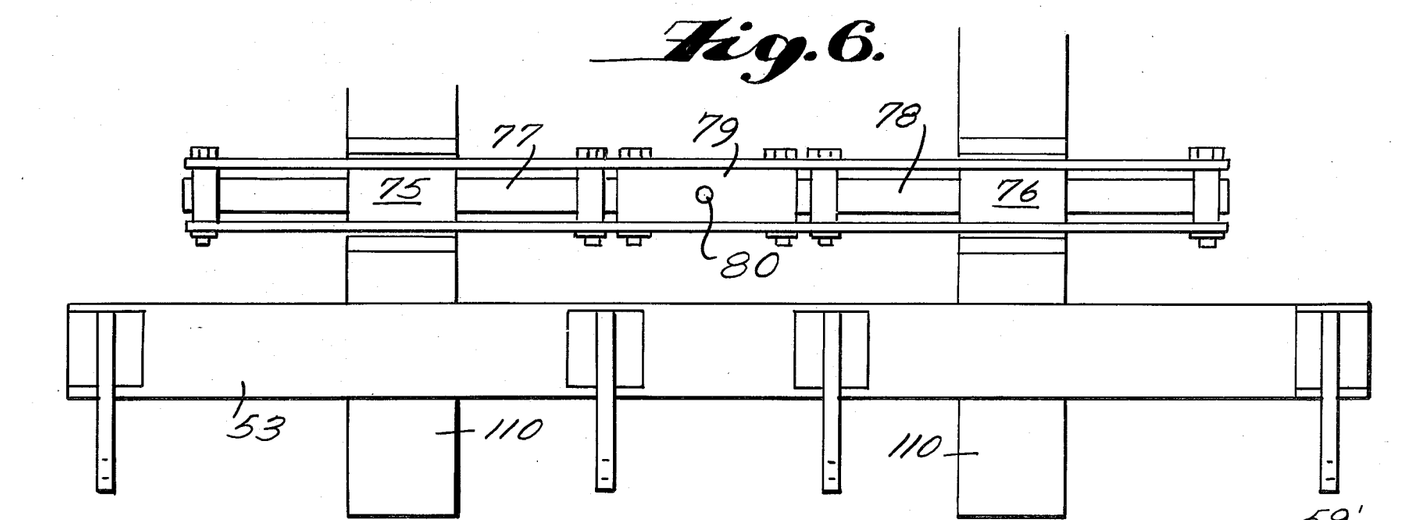
FIG. 6 is a plan view of the means for interconnecting the rasper housings and the T-bar elements.
Figure 7:
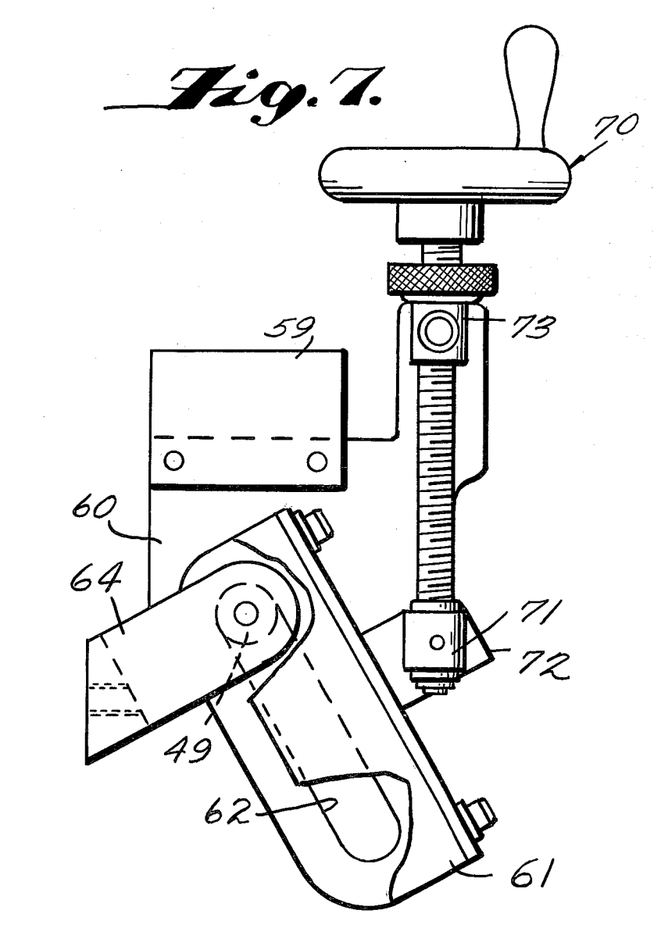
FIG. 7 is a detail front elevation of the adjustable cam guide for controlling the angle of travel of the right hand shoulder rasping tool shown in FIG. 1 as it moves across the shoulder of the tire.
Figure 8:
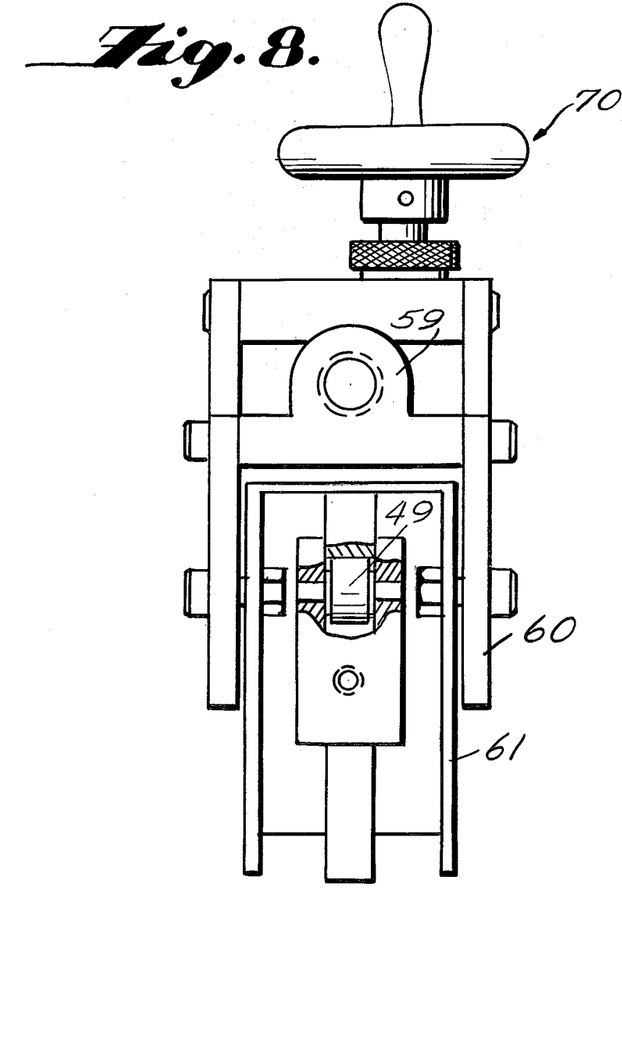
FIG. 8 is a side elevation, partly broken away, of the adjustable guide shown in FIG. 7.
Figures 9, 10:
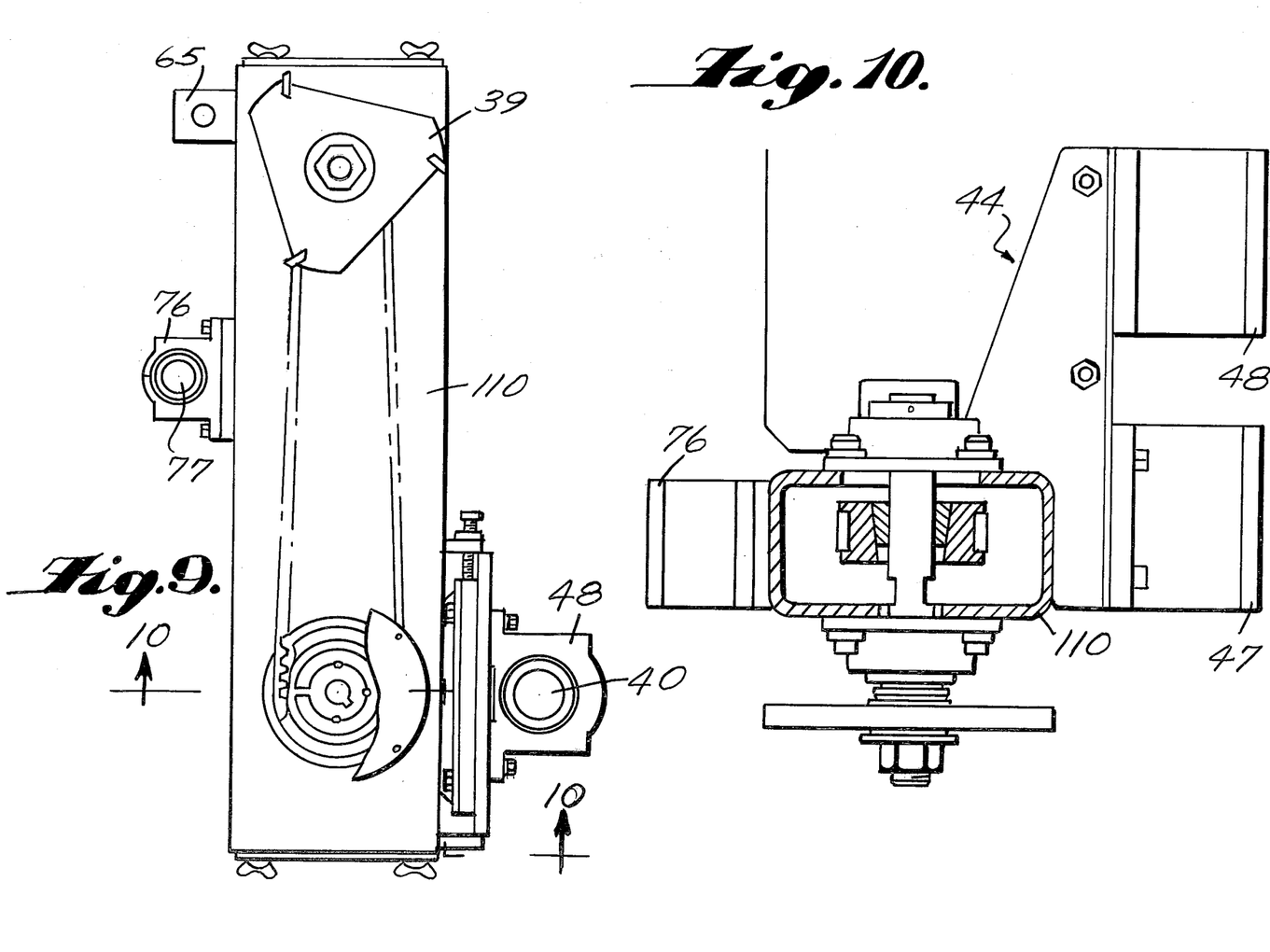
FIG. 9 is a side elevation of the shoulder rasping assembly.
FIG. 10 is a view looking at an offset sectional line indicated as 10—10 in FIG. 9.

Each buff angle guide 61 as shown in FIGS. 6 and 7 is adjustably moved about its pivotal mounting on body 60 by the hand wheel and screw means 70 that cooperate with the pivot connection 71 that engages on stud 72 integral with the guide 61. The screw is carried in a threaded nut 73 supported on body 60 so that the angle of the cam track in guide 61 may be adjusted as desired. Suitable scale means 74 may be provided between body 60 and guide 61 so that the angle of the guides for controlling the path of movement of the swinging end of each of the spaced apart shoulder rasping tools may be made identical, as will appear more fully below.

The actual shoulder rasping means forming a part of the assemblies generally designated 43 and 44, are shown in more detail in FIGS. 3, 6, 9 and 10. Each rasper has a housing 110 having pillow blocks 75 and 76 integral with the upper sides of their housings for supporting bearing bars 77 and 78. The inner ends of the bars 77 and 78 are connected by coupling 79 to which the lower end of a piston rod 80 is attached. The rod 80 is connected to a piston driven by hydraulic fluid delivered to cylinder 81 of a hydraulic motor shown in FIGS. 1 and 2 mounted on crossbar 13 of the frame. Any simple and well known hydraulic pump, conduit and valve control means (not shown) may be used in connection with this structure and the fluid system may be activated by control means as described below. The bars 77 and 78 may be raised and lowered as pressure fluid is delivered to one side or the other of the piston in the cylinder of the hydraulic motor to cause the housings 110 to oscilate about shaft 40.

Figures 5, 11, 12, 13:
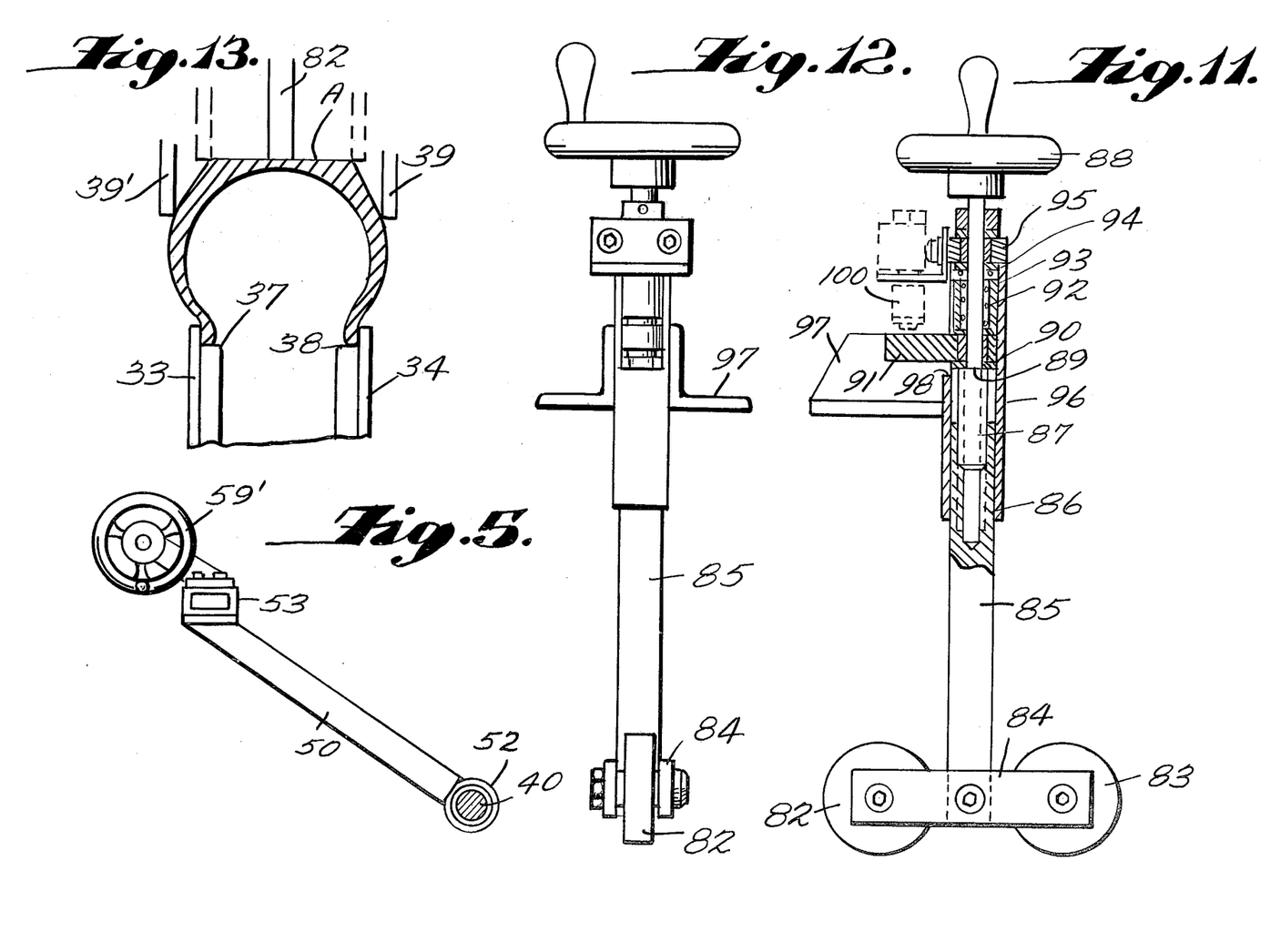
FIG. 5 is a side view of the pivoting support mounting for the adjusting means shown in FIG. 4.
FIG. 11 is a side elevation of the tire feeler means carried on the T-bar element.
FIG. 12 is a front view of the feeler mechanism shown in FIG. 11.
FIG. 13 is a cross-section through a portion of a tire that has been rasped across its crown showing feeler means and shoulder rasping means in contact with the tire.

A suitable feeler means that cooperates with the rasped crown of the tire to control the oscilation of the T-bar 50 that carries the guide means on the crossbar 53 of the T-bar support is operative to operate valve means that control the flow of pressure fluid to the hydraulic motor. The feeler means extends downwardly in front of the crossbar 53 as shown in FIGS. 1 and 3 and at its lower end as shown in FIGS. 11 and 12, includes a pair of wheels 82 and 83 that are supported at the opposite ends of bar means 84 which in turn is pivotally connected to the lower end of the vertically disposed rod 85. The upper end of rod 85 is drilled to have a threaded bore 86 for receiving a vertical threaded post 87 therein. The post is keyed to a hand wheel 88 for adjusting the initial spacing of the feeler wheels above the rasped crown to accommodate the mounting of different sizes of tires in the machine. The shaft 87 has a shoulder 89 formed thereon for supporting thrust bearing 90 which in turn carries a valve control bracket 91 for movement with shoulder 89. The bracket 91 is resiliently pressed downwardly against the shoulder 89 by spring 92 surrounded by a housing 93 concentric with the upper end of shaft 87. The upper end of spring 92 engages against a thrust bearing 94 that bears against the support 95 mounted on the casing 96 welded to bracket means 97 that in turn is adapted to be bolted onto the crossbar 53 of T-support 50. The support 96 has a window 98 cut in its upper end to permit the valve control bracket 91 to extend outwardly from shaft 85 and move up and down relative to support 96 to, for example, permit shaft 87 to move upwardly against the resistance of spring 92 when feelers 82-83 engage on the rasped crown A as shown in FIG. 13 to allow bracket 91 to engage a pneumatic valve 100 for slowing down the feed of hydraulic fluid to cylinder 81, while the shoulder rasping means are rendered active to rasp the shoulders.

When the T-bar support is oscilated by piston rod 80 to move the feeler wheels 82 and 83 into contact with the previously buffed periphery of the tire, the wheels 82 and 83 engage on the centerline of the rasped crown of the rotating tire. As the cylinder 81 continues to drive the T-bar to oscilate downwardly until the valve 100 detects when the feeler wheels are in contact with the tire and then as the wheels 82 and 83 rotate over the surface of the tire and vertical rod 85 of the feeler is held in a relatively fixed position while the T-bar continues to move downwardly, this motion causes the shoulder 89 on rod 85 to remain relatively fixed while spring 92 is compressed until valve 100 engages bracket 91 supported on shoulder 89. The valve 100 is then operative to throttle the flow of hydraulic fluid to cylinder 81 to continue the downward drive of the T-bar, but at a slower rate to drive the piston rod against connector 79 to drive bearing rods 77 and 78 and the housing 110 of the shoulder rasping means downwardly. As above described, each housing of the shoulder rasping means is pivotally carried at one end on bar 40 and its other swinging end is supported on cam roller 49 that cooperates with guiding cam surface 62. As the motion of the T-bar support and its integral crossbar 53 stops when the feelers wheels 82 and 83 engage the rasped crown, the continued drive of the piston in motor 81 causes shafts 77 and 78 to slowly drive the housings 110 of the shoulder rasping means to continue to oscilate slowly downward about the axis of the fixed shaft 40. As the shoulder rasper housings oscilate, the cam rollers 49 follow the now relatively stationary cam surfaces 62 to cause the shoulder rasping housings to slide sidewise along rods 40, 77 and 78 as the rollers 49 move downwardly at an angle along the cam tracks. When the driving stroke of the piston in cylinder 81 has been completed, the flow of fluid in the hydraulic system is reversed and the piston rod first lifts the housings 110 of the shoulder rasping means to move cam wheels 49 upwardly in the cam tracks to slide the rasping means latterly along shafts 40, 77 and 78 back to their initial positions and then the feeler wheels 82 and 83 are lifted from the tire as the piston is continuously driven to pick up the T-bar support. As soon as valve 100 is deactivated by the relative motion between rod 85 casing 96, the fluid feed to motor 81 is speeded up so that a rapid return of the several shoulder rasping and feeler means to the initial inoperative position is accomplished.

It is seen that the relative motion produced between the feeler when its wheels remain in a fixed position upon reaching the rasped crown, causes a continuing but slower movement of the piston to drive the two shoulder rasping means to move in their preestablished paths determined by the position of the cam tracks 62 in the buffing angle guide means 61. The angle for rasping the shoulders may be adjusted by turning each of the hand wheels 70 and also the relative spacing of the shoulder rasping means on each side of the feeler means can be adjusted by turning hand wheel 59' integral with the right and left hand threaded means 56 and 57 on which the nuts 58 and 59 of the pair of shoulder rasping means are respectively mounted.

After the crown and shoulders have been buffed as required for recapping, the side walls of the carcass may be cleaned up with suitable hand manipulated side wall buffing means 105 hingedly mounted on one of the side posts 12 of the frame. Such a buffer may be carried on a support bar 106 hinged to post 12, and a buffing wheel and motor drive assembly may be pivotally carried on the outer end of bar 106 to manually pressed against the side walls of the tire to be trimmed as needed.

With the above described apparatus, a tire carcass can be buffed in a controlled sequence to produce a precise rasped crown and shoulder relationship. The feeler is positioned to ride the centerline of the crown and the shoulder rasping means are moved by the guide means through paths to produce the preferred rasped relationship of crown and shoulders to expedite the retreading operation. The oscilation of the T-bar is made responsive to the position of the feeler means relative to the crown of the tire carcass so that the proper feeding action of the driven shoulder rasping means takes place across the shoulder areas of the tire carcass. The relative positions of the shoulder rasping means and their angle of cut can be adjusted accurately whereby it is possible to produce very precisely rasped crown and shoulder areas on a tire carcass to permit more accurate cutting and assembly of the rubber strips assembled onto the carcass to complete the recapping operation more effeciently.

While the above description covers the preferred form of this invention, it is possible that modifications thereof may occur to those skilled in the art, that will fall within the scope of the following claims.

What is claimed is:

1. An apparatus for rasping the shoulders on the opposite sides of the crown on a tire carcass being prepared for recapping, comprising a frame, means on said frame for rotatably supporting a tire carcass with its rasped crown centered at a rasping station where said shoulders are to be rasped to have a desired shape relative to said crown, feeler means for engaging against the rasped crown, support means on said frame for said feeler means a pair of separate rotatably driven shoulder rasping means mounted on said support means and being adapted to be moved thereon in controlled paths while engaging respectively against said shoulders on the opposite sides of said crown, means responsive to the engagement of said feeler on said crown to drive each of said shoulder rasping means to move on said support, and guide means on said support means for cooperating with said shoulder rasping means, said guide means coacting with said rasping means as they move on said support to control the direction of movement of said rasping means as the separate rasping means move in said paths over said shoulders and relative to said feeler means.

2. A structure as in claim 1 wherein said guide means is adjustable.

3. A structure as in claim 1 wherein said guide means provides a straight-line guide along said paths.

4. A structure as in claim 1 having bearing means for movably supporting said shoulder rasping means and wherein said rasping means is oscillatably and slidably carried on said support means to coact with said guide means.

5. A structure as in claim 4 wherein said support means is a rigid bar and said guide means is adjustable between selected positions to control the shape of said rasped shoulders relative to said rasped crown.

6. A structure as in claim 5 wherein said guide means is a straight-line cam means.

7. A structure as in claim 5 wherein said apparatus is supported on a fixed frame and said support means on which said feeler and rasping means are mounted is a rigid bar carried on said frame, and adjusting means disposed between said feeler and said guide means to position said guide means relative to said feeler means to control the position of said shoulder rasping means at all times while said feeler means is in contact with said rasped crown.

8. A structure as in claim 7 wherein each of said pair of shoulder rasping means includes a housing having one end supported on said bar and a follower engaging with said guide means to cause said housing to oscillate and slide on said bar as the rasping means moves on the support.

9. A structure as in claim 1 wherein each of said shoulder rasping means includes a rotatably driven cutter, and said means to drive each of said shoulder rasping means to move on said support includes a second power drive means to move each of said shoulder rasping means relative to said feeler.

10. A structure as in claim 9 having a rigid bar forming a bearing means for movably supporting each of said shoulder rasping means and wherein each of said separate shoulder rasping means is carried to oscilate and slide on said bearing means under the control of said guide means.

11. A structure as in claim 10 wherein said apparatus is carried on a fixed frame and said rigid bar is carried on said frame, said apparatus also including means to adjustably support said feeler and said guide means relative to said bar to position said feeler means in contact with said rasped crown, and said second drive means is connected between said frame and said separate shoulder rasping means to effect the desired oscilating and sliding motion needed to move said pair of shoulder rasping means in said paths.

12. A structure as in claim 11 wherein each of said pair of shoulder rasping means includes a housing having one end supported on said bar and a follower engaging with said guide means, and said second drive means being operatively connected to the other end of said frame to effect the cooperation between each of said shoulder rasping means and the guide means.

13. A structure as in claim 1 wherein said apparatus includes adjustable support means for said pair of shoulder rasping means, said adjustable support means being operative to permit said pair of shoulder rasping means to be selectively moved to predetermined equidistant positions on opposite sides of said feeler means.

14. A structure as in claim 1 wherein said apparatus is supported on a fixed frame and has bearing means for movably supporting said shoulder rasping means, said bearing means including a rigid bar carried by said fixed frame, each of said shoulder rasping means having a housing, said housings for each of said rasping means being slidably and oscillatably carried at one end on said rigid bar with a follower engaged with said guide means, each of said shoulder rasping means including a rotatably driven cutter and said means responsive to the engagement of said feeler on said crown to drive each of said shoulder rasping means to move on said support includes a power drive means operatively connected to move said followers in said guide means to effect a sliding and oscillating movement of said rasping means when said feeler is moved into contact with said rasped crown, said guide means being adjustably supported relative to said feeler, and said feeler responsive drive is mounted on said fixed frame to be connected to said rasp housing to control the oscillating and sliding of said shoulder rasps along said paths.

* * * * *